US005349006A

United States Patent [19]

Swarup et al.

[11] Patent Number: 5,349,006

[45] Date of Patent: Sep. 20, 1994

[54] AZETIDINOL REACTION PRODUCTS USED AS PIGMENT GRIND AND FILM FORMING VEHICLES

[75] Inventors: Shanti Swarup, Gibsonia; Padmanabhan Sundararaman, Allison Park; Gregory J. McCollum, Gibsonia; Charles M. Kania, Natrona Heights; James A. Claar, Mars, all of Pa.

[73] Assignee: PPG Industries, Inc., Pittsburgh, Pa.

[21] Appl. No.: 190,967

[22] Filed: Feb. 3, 1994

Related U.S. Application Data

[62] Division of Ser. No. 814,656, Dec. 30, 1991.

[51] Int. Cl.[5] .................... C08F 8/30

[52] U.S. Cl. .................... 524/507; 524/509; 524/556; 524/564; 525/124; 525/128; 525/143; 525/163

[58] Field of Search .................... 524/507, 509, 556, 564; 525/124, 128, 143, 163

[56] References Cited

U.S. PATENT DOCUMENTS 3,290,416 12/1966 Christenson et al. .
3,290,417 12/1966 Christenson et al. .
3,291,679 12/1966 O'Brien .
3,325,443 6/1967 Christenson et al. .
3,332,797 7/1967 Strasser et al. .
3,386,939 6/1968 Mesec .
3,705,076 12/1972 Usala .
3,980,682 9/1976 Danner et al. .
4,576,980 3/1986 Dai et al. .
4,612,098 9/1986 Dai et al. .
4,735,984 4/1988 Gouji et al. .

FOREIGN PATENT DOCUMENTS 1469525 1/1969 Fed. Rep. of Germany .
654889 4/1965 France .
2224498 10/1974 France .
867398 5/1961 United Kingdom .

OTHER PUBLICATIONS

"Preparation of 3-Azetidinols with Non-Bulky 1-Alkyl Substituents", Robert H. Higgins, Quentin L. Eaton, Leroy Worth, Jr. and Myra V. Peterson, J. Heterocyclic Chem., vol. 24, pp. 255–259, 1987.

"Cationic Polymerization of Cyclic Amines, 7 Ethyl 3-Azetidinylpropionate", Jan Lukaszczyk, Etienne H. Schacht and Eric J. Goethals, Makromol. Chem., Rapid Commun. 1, pp. 79–84, 1980.

"Cyclization of 1-Alkylamino-3-halo-2-alkanols to 1-Alkyl-3-azetidinols", V. R. Gaertner, J. Organic, vol. 32, pp. 2972–2976, 1967.

"Studies on Azetidine Derivatives. I. Synthesis of 3-Substituted Azetidine Derivatives", Tetsuya Okutani, Tatsuhiko Kaneko and Katsutada Masuda, Chem. Pharm. Bull., vol. 22, No. 7, pp. 1490–1497, (1974).

"Ketenes. XIV. Adducts of Dimethylketene with C=N Compounds", James C. Martin, Kent C. Brannock, Robert D. Burpitt, P. Glenn Gott and V. A. Hoyle, Jr., J. Org. Chem., vol. 36, No. 16, pp. 2211–2215, 1971.

"New investigations of the reaction of epichlorohydrin with hindered amines: X-ray and NMR analyses", Michel Laguerre, Chantal Boyer, Jean-Michel Leger and Alain Carpy, Can. J. Chem., vol. 67, pp. 1514–1522, 1989.

(List continued on next page.)

*Primary Examiner*—Bernard Lipman
*Attorney, Agent, or Firm*—Linda Pingitore

[57] ABSTRACT

An ungelled reaction product is prepared from a carboxylic acid group containing polymeric material and an azetidinol containing material having one azetidinol moiety per molecule. The ungelled reaction product is particularly useful as a grind vehicle for pigment grind compositions.

13 Claims, No Drawings

OTHER PUBLICATIONS

"Polymerization via Betaine. V. Alternating Copolymerization of 1,3,3-Trimethylazetidine with Acrylic Acid. A Novel Method for the Preparation of Amine--Ester Type Polymer", Takeo Saegusa, Yoshiharu Kimura, Satoru Sawada and Shiro Kobayashi, Macromolecules, Communications to the Editor, vol. 7, No. 6, pp. 956-958, 1974.

"Reactive Polymers Containing Pendant Azetidine or Azetidinium Functions, 1", Yvan Bogaert, Eric Goethals and Etienne Schacht, Makromol. Chem. 182, pp. 2687-2693, 1981.

"Polymers Derived from N-alkyl Azetidinols", Eric J. Goethals, Jianing Huang and Dirk Mestach, Polymer Preprint, vol. 31, pp. 57-58, 1990.

"A General Method for the Synthesis of Substituted Azetidines", S. S. Chatterjee and A. Shoeb, Snythesis 3, pp. 153-154, 1973.

"Synthesis and Cyclodimerization of Stable 1-t-alkylamino-2,3-epoxypropanes; Related Sterically Promoted Eight-Membered Ring Closures," V. R. Gaertner, Tetrahedron Letters No. 3, pp. 141-146, 1964, Pergamon Press.

"Cyclization of 1-alkylamino-3-halo-2-alkonols to 1-alkyl-3-azetidinols," V. R. Gaertner, Tetrahedron Letters No. 39, pp. 4691-4694, 1966, Pergamon Press Ltd.

AZETIDINOL REACTION PRODUCTS USED AS PIGMENT GRIND AND FILM FORMING VEHICLES

CROSS REFERENCE OF RELATED APPLICATIONS

This application is a divisional of application Ser. No. 07/814,656, filed Dec. 30, 1991, which was related to U.S. patent application Ser. No. 814,655, filed Dec. 30, 1991, entitled Polyazetidinol Containing Materials, now U.S. Pat. No. 5,276,166.

BACKGROUND OF THE INVENTION

The present invention relates to azetidinol containing materials having one azetidinol moiety per molecule and reaction products prepared therefrom.

Acrylic polymers have been well known as vehicles for coating compositions as well as for pigment grind pastes used in formulating such coating compositions. They can provide tough, resilient and durable coatings with excellent aesthetic properties.

Small nitrogen ring containing materials such as aziridines have been used as modifiers for coating compositions such as those described above for sometime. For example, U.S. Pat. No. 3,290,417 to Christenson et al discloses that the overall properties of coatings based on interpolymers of hydroxyalkyl esters are greatly improved by the inclusion of a small proportion of acidic units in the polymeric vehicle and reacting these acidic groups with an alkyleneimine or a substituted alkyleneimine. A further example is U.S. Pat. No. 3,290,416 which discloses coating compositions containing polymerized alkyl methacrylates which have been modified to improve their properties by the inclusion of imine-reacted acidic groups.

Aziridines, however, despite their potential for improving the overall properties of coatings formulated with the polymers they modify, are highly reactive materials which have a number of attendant disadvantages. Their highly reactive nature makes them unstable and in addition they are highly toxic requiring special conditions for handling. The most commonly available forms, ethylene imine and proplene imine are low molecular weight materials which are so unstable, safe transportation is virtually impossible. Moreover they are highly toxic materials which may have carcinogenic side effects.

In addition, materials derived by reacting ethylene imine or proplene imine with carboxylic acids tend to undergo rearrangement to the corresponding amide under certain severe conditions like prolonged heating thereby reducing the yield of desired aminoester product. Further, their high reactivity often results in a small amount of homopolymer by-product formation. The homopolymer causes the final film to be hazy thus impairing the appearance properties of coatings prepared from these materials.

There is a need for a way to prepare modified acrylic polymers which have all of the beneficial properties of the aziridine modified materials but without the attendant disadvantages.

SUMMARY OF THE INVENTION

In accordance with the present invention there is provided a pigment grind composition comprising pigment and as a grind vehicle an ungelled aminoester group-containing reaction product obtained by reacting carboxyl groups of a carboxylic acid group containing polymeric material with azetidinol groups of an azetidinol containing material having one azetidinol moiety per molecule.

Also provided is a coating composition comprising the aforesaid aminoester group-containing reaction product as a film forming vehicle and a crosslinking agent.

Further provided is a method of preparing the aforesaid azetidinol containing material having one azetidinol moiety per molecule.

DETAILED DESCRIPTION OF THE INVENTION

Azetidinal containing materials having one azetidinol moiety per molecule are very useful as providers of aminoester groups for modifying acrylic polymers and a variety of other oligomers and polymers without the handling hazards attendant to aziridines. Contrary to what has been theorized by some skilled artisans, for example U.S. Pat. No. 3,705,076 assigned to E.I. du Pont de Nemours, column 6, lines 48 to 53, azetidines are not as reactive as the 1,2 imines, thus the azetidines present small danger in handling.

Oligomers and polymers such as acrylics modified with azetidinol containing materials having one azetidinol moiety per molecule can be prepared at low cost in high yield from readily available raw materials under ordinary processing conditions without significant concern for toxic side effects or safety hazards. The stability of the such azetidinol materials also results in better stability upon shipping and storage and improved film properties when the materials are used in coating applications. The azetidinols do not undergo rearrangement or homopolymerization as readily as the aziridines mentioned above in the background.

The ungelled reaction products of the present invention which are prepared from azetidinol containing materials having one azetidinol moiety per molecule, therefore, are very advantageous in coating applications. When prepared from acrylic polymers, the ungelled reaction products are most useful as pigment grind vehicles. They are also useful for general coating applications.

The claimed ungelled reaction products, as was mentioned above, have as one reactant, a carboxylic acid group containing polymeric material. The carboxylic acid group containing polymeric material can be selected from a variety of materials. Examples of suitable materials include vinyl addition polymers prepared from the vinyl addition polymerization of vinyl monomers, polyesters, polyethers, polyurethanes and polyamides. A detailed description of all of these materials is not felt to be necessary since one skilled in the art of coatings enjoys extensive knowledge of these materials. If additional information is desired see Kirk Othmer, Encyclopedia of Polymer Science and Technology, John Wiley and Sons, Inc. Copyright 1964. The carboxylic acid group containing polymeric material generally has an acid value of at least 2.5, preferably at least 5. Generally the acid value ranges from about 5 to about 130.

The acid value is the number of milligrams of potassium hydroxide required to neutralize the free acids present in one gram of polymer sample. The determination is made by titrating the sample in a suitable solvent such as ethanol or acetone using phenolphthalein or phenol red as indicator.

A preferred carboxylic acid group containing polymeric material is a carboxylic acid functional acrylic polymer. This preferred polymer will be discussed in detail below.

The aforesaid acrylic polymer can be prepared by the vinyl addition polymerization of a vinyl monomer component which comprises at least a portion of a carboxyl functional vinyl monomer. Examples of suitable carboxyl functional vinyl monomers include acrylic acid, methacrylic acid, monoesters of unsaturated dicarboxylic acids such as maleic acid, fumaric acid, and itaconic acid, for example, mono(hydroxyethyl) and mono(hydroxypropyl) esters of maleic acid. The balance of the vinyl monomer component can include a variety of other vinyl monomers which contain polymerizable vinyl unsaturation. For example, hydroxyl functional vinyl monomers such as 2-hydroxyethyl acrylate, 2-hydroxyethyl methacrylate, 2-hydroxypropyl acrylate, 2-hydroxypropyl methacrylate and 2-hydroxybutyl methacrylate. Also useful are acrylamide; N-methylolacrylamide and N-alkoxymethyl acrylamides such as N-ethoxymethyl acrylamide and N-butoxymethylacrylamide; tertiary-butylaminoethyl methacrylate; sulfoethyl methacrylate; and alkyl acrylates and methacrylates which contain from 1 to 18 carbon atoms in the alkyl portion such as methyl (meth)acrylate, ethyl (meth)acrylate, propyl (meth)acrylate, butyl (meth)acrylate, pentyl (meth)acrylate, hexyl (meth)acrylate, heptyl (meth)acrylate, 2-ethylhexyl (meth)acrylate, lauryl (meth)acrylate, stearyl (meth)acrylate, isodecyl (meth)acrylate and isobornyl (meth)acrylate. Also useful are styrene, para-methyl styrene, alpha-methyl styrene, acrylonitrile, methacrylonitrile and vinyl esters such as vinyl acetate or vinyl versatate. Mixtures of the aforesaid monomers can also be utilized. Preferably, the acrylic polymer has a number average molecular weight ranging :from about 500 to about 50,000, more preferably about 2000 to about 20,000.

To obtain the advantages of the present invention, the amount of carboxyl functional vinyl monomer in the vinyl monomer component generally ranges from about 0.1 percent by weight to about 35 percent by weight or more, the percentages based on the total weight of the vinyl monomer component. When the ungelled reaction product is used as a grind vehicle the amount of carboxyl functional vinyl monomer in the vinyl monomer component preferably ranges from about 0.5 percent by weight to about 5 percent by weight. When the ungelled reaction product is used as a film former in coating compositions, the amount of carboxyl functional vinyl monomer in the vinyl monomer component preferably ranges from about 1 percent to about 20 percent by weight.

Preparation of the vinyl addition polymer is usually conducted at a temperature within the range of about 25° C. to about 250° C., preferably 85° C. to 160° C. There is generally present a free radical initiator which is selected from a wide variety of materials. Suitable types of materials include peroxides, hydroperoxides and azo initiators. Examples of these types of initiators include di-tertiary butyl peroxide, di-cumyl peroxide; amyl peroxyacetate; cumene hydroperoxide; 2,5-dimethyl-2,5-bis(tertiary butyl peroxy)hexane; hexyne-3-tertiary butyl cumyl peroxide; tertiary amyl peroxide; 2,5-dihydroperoxy 2,5-dimethylhexane, di(n-propyl)-peroxydicarbonate and 2,2′-azobis(2,4-dimethyl-4-methoxyvaleronitrile). Also suitable are Redox initiators such as the combination of hydrogen peroxide and isoascorbic acid. Transition metals such as iron are usually used as coinitiators with a redox initiator system in aqueous polymerization.

The type and amount of initiator will be selected depending upon the molecular weight desired and/or the final form of the polymeric species, i.e., solvent soluble form or dispersed form in aqueous or non-aqueous media. The amount of initiator can vary widely although usually it is present in an amount ranging from about 0.1 percent to about 8 percent, the percentage based on the total weight of the vinyl monomer component. Generally, there may also be present during the vinyl addition polymerization a solvent which also may assist in maintaining the preferred reaction temperature. Examples of these solvents include ketones such as methyl amyl ketone, aromatic petroleum distillates, esters such as butyl acetate, heptyl acetate and 2-ethylhexyl acetate, and high boiling ester solvents such as those commercially available from Exxon Chemical Corporation under the trademark designations EXTATE 600 and EXTATE 700.

It should be understood that the carboxylic acid functional acrylic polymers may also be prepared by conventional suspension, emulsion and non-aqueous dispersion polymerization techniques.

The azetidinol containing material having one azetidinol moiety per molecule can be represented by the following structural formula:

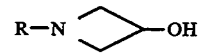

wherein R is $C_1$ to $C_{20}$ alkyl, $C_3$ to $C_7$ cycloalkyl or aralkyl. Examples of suitable alkyl groups include methyl, isopropyl, tertiary butyl and octyl. Examples of suitable cycloalkyl groups include cyclopropyl, cyclobutyl, cyclopentyl, and cyclohexyl. A representative aralkyl group is benzyl. Preferably, R is cyclohexyl. These products are most suitable as pigment grind vehicles.

R can also be an oligomeric or polymeric moiety such as for example an alkoxy terminated polyether. These products are most suitable as film forming vehicles for coating compositions.

The azetidinol containing materials having one azetidinol moiety per molecule generally can be prepared by the reaction of an amine with epihalohydrin followed by removal of hydrogen halide. The reaction is preferably conducted in the presence of a blend of at least one polar solvent and at least one non-polar solvent. The polar solvent is a dipolar aprotic solvent having a dielectric constant at 25° C. of at least 30.

Suitable amine containing materials include primary amines such as butylamine, hexylamine, hydroxy propylamine, tertiary butylamine and cyclohexylamine. Suitable epihalohydrins include epichlorohydrin and epibromohydrin. Examples of polar solvents include acetonitrile, methanol, ethanol, isopropanol, butanol, dimethylformamide and dimethylsulfoxide. Examples of non polar solvents include toluene, xylene and heptane.

Preferably, the amine containing material is cyclohexylamine, the epihalohydrin is epichlorohydrin, the polar solvent is acetonitrile and the non polar solvent is toluene.

After the initial mixing, the cyclohexylamine and epichlorohydrin are reacted at a temperature and for a period sufficient to form the hydrochloride salt of the N-cyclohexyl azetidinol. Generally, the reaction temperature ranges from about 70° C. to about 80° C. and the time ranges from about 1 to about 6 hours.

In a preferred embodiment of the invention, the hydrochloride salt of the N-cyclohexyl azetidinol is converted to the free amine base by neutralization with aqueous sodium hydroxide.

Preferably, after converting the hydrochloride salt of the N-cyclohexyl azetidinol to the free amine base, the product can be optionally stripped to remove water and the salt removed by filtration to yield a solution of the N-cyclohexyl azetidinol. Crystalline N-cyclohexyl azetidinol can be isolated by solvent stripping and recrystallization.

In the preferred embodiment detailed above, conversion of the hydrochloride salt of the N-cyclohexyl azetidinol to the free amine base preferably involves the steps of:

(1) removing up to 70 percent of the polar solvent, (2) neutralizing the N-cyclohexyl azetidinol hydrochloride while adding additional non-polar solvent, (3) removing a portion of the non-polar solvent, and (4) removing the salt by filtration.

The ungelled reaction product of the present invention is prepared by reacting the carboxylic acid group containing polymeric material and the azetidinol containing material to form a covalent bond. The acid groups of the acid functional resin can be fully or partially reacted with N-cyclohexyl azetidinol in such solvents as toluene, xylene or butyl acetate. The temperature of the reaction generally ranges from about 110° C. to about 130° C. The progress of the reaction can be monitored by measuring acid value which decreases as acid groups react with azetidinol and becomes constant when all the azetidinol groups are consumed.

The ungelled reaction product is especially suitable as a grind vehicle in preparing pigment grind compositions. It has been observed that the ungelled reaction products enhance color development of a pigment in a grind paste. Color development is a measure of the color intensity developed in a pigment grind paste relative to a standard.

The grind vehicles of the present invention can be used to grind pigments in a conventional manner well known to those skilled in the art. Typically, a solvent mixture, grind resin, and required amount of pigment are mixed together with a cowles blade for about 15 to about 30 minutes. The resulting paste is then passed through an Eiger Mill operating at 4000–6000 rpm. until a Hegman reading of 7.0 is obtained. Cold water is circulated around the mixing chamber during the operation of the mill to keep the temperature below 40° C. The grind paste, thus obtained, is used to make final paint.

In one particularly preferred embodiment, the ungelled reaction product detailed above is modified by reaction with a triisocyanate and tetraethylene pentamine. This modified ungelled reaction product is especially suitable as a grind vehicle for red pigments.

The ungelled reaction product of the present invention is also suitable as a film former in preparing thermosetting or curable coating compositions for a variety of applications.

The ungelled reaction product of the claimed invention contains an active hydrogen functional material, i.e., a hydroxy aminoalkyl ester, and is capable of being cured with crosslinking agents such as aminoplasts, phenoplasts or blocked polyisocyanates through reaction of the hydroxyl groups.

Polyisocyanates which may be used as curing agents include aliphatic or alicyclic polyisocyanates such as hexamethylene diisocyanate and dicyclohexylmethane diisocyanate; aromatic polyisocyanates such as 2,4- and 2,6-toluene diisocyanate and mixtures thereof, and diphenylmethane-4,4'-diisocyanate; arylalkyl polyisocyanates such as ortho-, meta- and para-xylylene diisocyanate; isophorone diisocyanate; polyurethane polyisocyanates obtained from reacting polyisocyanates such as those mentioned above with polyhydroxy compounds such as ethylene glycol and trimethylolpropane. Polyisocyanates containing isocyanurate, allophanate or biuret groups can be also used.

When polyisocyanates are used as curing agents in compositions containing polymer products of the invention, an effective amount of a catalyst for promoting cure between hydroxyl groups of the polymer product and isocyanato groups of the polyisocyanate may be incorporated. Examples of such catalysts include tertiary amines such as triethylamine or 1,4-diazobicyclo-(2:2:2)octane, and organotin compounds such as stannous octoate and dibutyltin dilaurate.

The polyisocyanates above can be blocked with a suitable blocking agent which would unblock at elevated temperature, thereby facilitating formulation of a stable one package composition. Examples of blocking agents include lower aliphatic alcohols such as methanol, oximes such as methyl ethyl ketone oxime and lactams such as caprolactam.

Other curing agents which are reactive with active hydrogens in polymer products of the invention include aminoplast resins which are aldehyde condensation products of amines or amides with aldehydes. Examples of suitable amines or amides are melamine, benzoguanamine, urea and similar compounds. Generally, the aldehyde employed is formaldehyde, although products can be made from other aldehydes such as acetaldehyde and furfuryl. Condensation products contain methylol groups or similar alkylol groups depending upon the particular aldehyde employed. If desired, these methylol groups can be etherified by reaction with an alcohol. Various alcohols are employed and generally include any monohydric alcohol, although the preferred alcohol contains from 1 to 4 carbon atoms such as methanol, ethanol, isopropanol and n-butanol. Aminoplasts are commercially available from the American Cyanamid Company under the trademark CYMEL and from the Monsanto Chemical Company under the trademark RESIMINE.

Such curable (crosslinkable) or thermosetting compositions can be formulated as clear coats or optionally they can contain a pigment. The pigments may be any of the conventional types comprising, for example, iron oxides, lead oxides, strontium chromate, carbon black, coal dust, titanium dioxide, talc, barium sulfate, as well as the color pigments such as cadmium yellow, cadmium red, chromium yellow, phthalocyanine blue, toluidine red, and the metallic pigments such as aluminum flake and metal oxide encapsulated mica. When used, the pigment content of the coating composition is expressed as a pigment to resin weight ratio, and is usually within the range of about 0.05 to 3.0:1.

In addition, other optional ingredients such as adjuvant hydroxy-containing polymers, fillers, plasticizers, catalysts, reactive diluents, anti-oxidants, ultraviolet light absorbers, flow control agents, and other formulating additives can be employed if desired.

Coating compositions of the invention can be applied to a variety of substrates such as wood, metal, glass, cloth, plastic, foams and the like by a variety of application techniques such as air spraying, airless spraying, dipping, brushing and flow coating. The coating compositions are suitable as basecoats or clearcoats and are particularly desirable as topcoat compositions for automobiles and trucks either as original finishes or as refinish coatings. Also, the coating compositions can be applied as color plus clear in basecoat-clearcoat applications.

The following examples are illustrative of the invention and are not intended to be limiting.

EXAMPLE I

Synthesis of N-Cyclohexyl Azetidinol

| Charge | Parts by Weight (grams) |
|---|---|
| Cyclohexyl amine | 1244 |
| Toluene | 1200 |
| Acetonitrile | 3000 |
| Feed A Epichlorohydrin | 1154 |
| Feed B Toluene | 3400 |
| Feed C 50% aqueous sodium hydroxide | 1030 |
| Feed D Toluene | 2398 |

Feed A was added over one half hour into the charge at room temperature. The contents in the flask were heated slowly to about 75° C. and held for 5 hours at this temperature. The solvents were removed by distillation, followed by addition of Feed B. The flask was cooled to room temperature and Feed C was added. The mixture was agitated for about 40 minutes, filtered to remove the salt and then the solvents were removed by vacuum distillation. Finally Feed D was added. The resulting product was identified by Gas Chromatography and possessed the physical properties which are summarized in Table I.

TABLE I

| Cyclohexyl Azetidinol Properties | | |
|---|---|---|
| Total Solids (110° C. for one hour) | 50 percent (toluene) | |
| Color | Yellow to Brown | |
| Melting point after purification in 1 part methanol:2 parts ethyl ether | 78° C. to 80° C. | |
| Hydroxyl Value (empirical, titrated in 50 percent toluene) | 189 | |
| Hydroxyl Value (theoretical) | 182 | |
| Milliequivalents amine (theoretical) | 3.2 | |
| Acid Value | 3.0 ± 2 | |
| Molecular Weight (solid material) | 154 | |
| Chlorine | 0.05 to 0.1 percent | |
| Water | less than 0.05 percent | |
| Weight/gallon | 7.834 grams | |
| Molecular Weight by Gel Permeation Chromatography (GPC) | number average (Mn) | 111 |
| | weight average (Mw) | 153 |
| | Peak | 237 |

EXAMPLE II

Preparation of Azetidinol Modified Acrylic A 1,209.9 grams of an aliphatic/aromatic hydrocarbon (B.P. Range 110°-126° C.) was heated to 119° C.

At 119° C. two simultaneous additions of monomer and free radical initiator were made over a 3 hour period. The monomer feed comprised 416.05 g hydroxyethyl acrylate, 75.05 g methacrylic acid, 25.0 g acrylic acid, 1,248.15 g styrene, 832.1 g 2-ethylhexyl acrylate, 811.3 g butyl methacrylate, 748.9 g methyl methacrylate, and 54.1 g t-dodecyl mercaptan. The initiator feed comprised 422.55 g toluene and 62.4 g t-amyl peroctoate. Upon completion of the two feeds a solvent mix of 151.8 g of the above hydrocarbon and 51.5 g isobutanol was added to the reaction. An initiator feed comprised of 291.95 g of the hydrocarbon, 96.1 g isobutanol and 20.8 g t-amyl peroctoate was added over a one hour period with the temperature remaining at about 120° C. Upon completion of this feed, 74.8 g of the hydrocarbon and 25.3 g isobutanol were added and the reaction held at about 120° C. for one hour. At this point a mixture of 850.8 g hydrocarbon, 672.15 g isobutanol and 132.65 g cyclohexyl azetidinol (35.5% in Toluene) was added and a temperature of about 105° C. was maintained for one more hour.

The product solution had a solids content of 51.7%, a Gardner Holdt viscosity of 5.7 stokes (T), an acid value of 8.44 and a number average molecular weight of 7322 as determined by Gel Permeation Chromatography, GPC.

EXAMPLE III

Preparation of Azetidinol Modified Acrylic B

Polymer B was prepared in a manner similar to Polymer A except that after the cyclohexyl azetidinol reaction of one hour was complete, Polymer A was further modified by cooling to 40° C. to prepare Polymer B.

16.45 g of tetraethylene pentamine were then added, followed by the addition of a mixture comprised of 126.75 g butyl acetate and 77.1 g DESMODUR N, (isocyanurate of isophorone diisocyanate commercially available from Mobay Chemical Corporation; 80% solids in Dowanol PM Acetate). The reaction was finished upon completion of this feed.

The product solution had a solids content of 52.55%, a Gardner Holdt viscosity of 8.5 stokes (V), an acid value of 8.38, a number average molecular weight of 6183 by GPC. The infrared spectrum showed no free isocyanate.

EXAMPLE IV

Preparation of Polymer C

Comparative Example

Polymer C was prepared in the same manner as Polymer A except that the cyclohexyl azetidinol was omitted.

EXAMPLE V

Preparation of Polymer D (alkyleneimine modified)

Comparative Example

Polymer D was prepared in the same manner as Polymer A except that the cyclohexyl azetidinol solution was replaced by hydroxyethyl ethyleneimine on a molar basis.

EXAMPLE VI

Preparation of Polymer E (alkyleneimine/amine/isocyanate modified

Comparative Example

Polymer E was prepared in the same manner as Polymer B except that the cyclohexyl azetidinol solution was replaced by hydroxyethyl ethyleneimine on a molar basis.

EXAMPLE VII

Preparation of Polymer F (propyleneimine modified)

Comparative Example

Polymer F was prepared in the same manner as Polymer A in Example II except that cyclohexyl azetidinol was replaced by propyleneimine on a molar basis.

EXAMPLE VIII

Preparation of Polymer G (propyleneimine modified)

Comparative Example

Polymer G was prepared in the same manner as Polymer B in Example III except that cyclohexyl azetidinol was replaced by propyleneimine on a molar basis.

EXAMPLE IX

Praparation of Polymer H (Comparative Example)

Polymer H was prepared in the same manner as Polymer C in Example III except that cyclohexyl azetidinol was omitted.

EXAMPLE X

Carbon black pigment grind paste

| Carbon black pigment grind paste | |
|---|---|
| Materials | Amount (pound) |
| Carbon black pigment (from Mobay Chemical Corporation) | 0.78 |
| Grind Resin (Examples II, IV, V, VII) | 3.32 |
| Butyl Acetate | 1.96 |
| Wax (40% solution in xylene, from ChemCentral Industries) | 0.02 |

Four pigment grind pastes were prepared by mixing the above materials together in Steel Ball Attritor Mill (Size IS by Union Process Incorporated/ Szeguari System Intermill) for several hours until a Hegman reading of 8.0 was reached. Samples of paste were withdrawn every hour and color development was evaluated qualitatively by visual inspection in the following manner. A small pool of each paste was drawn down on a sheet of polypropylene and baked until dry. The dryed pastes were inspected for cloudiness, dirt, clumps of pigment and relative color. The results of the inspection are presented in Table 2. Each paste was rated on a scale of 0–5 for the above features, where 5 was best and 0 was worst.

TABLE 2

| Color development at various time intervals for carbon black pigment. | | | | | |
|---|---|---|---|---|---|
| Grind Resin | 1 hr | 2 hr | 3 hr | 4 hr | 5 hr |
| Example V | 2 | 2 | 3 | 4 | 5 |
| Example IV | 0 | 0 | 0 | 0 | 0 |
| Example VII | 2 | 2 | 4 | 5 | 5 |
| Example II | 5 | 5 | 5 | 5 | 5 |

EXAMPLE XI

In this example, red pigment (Perylene Red from Mobay Chemical Corporation) was ground in a manner similar to the carbon black in Example X using the grind resins prepared in Examples III, VI, VIII and IX. The results for color development are tabulated in Table 3.

TABLE 3

| Grind Resin | 1 hr | 2 hr | 4 hr | 5 hr |
|---|---|---|---|---|
| Example III | 1 | 3 | 4 | 5 |
| Example VI | 2 | 3 | 4 | 5 |
| Example VIII | 1 | 2 | 3 | 4 |
| Example IX | 0 | 0 | 1 | 2 |

EXAMPLE XII

This example presents grind paste viscosities of carbon black pigment at 43% total solids as ground in Example X (Table 2, 5 hrs).

The lower the grind paste viscosity the better the pigment grind. (Pastes of all of these Examples demonstrated good pigment grinding)

| Resin | Paste Viscosity (centipoise) |
|---|---|
| Example V | 150 |
| Example IV | 300 |
| Example VII | 750 |
| Example II | 100 |

EXAMPLE XIII

This Example presents grind paste viscosities of perylene red pigment as ground in Example XI (Table 3, 5 hrs) at 43% total solids. The pastes with lower viscosities (Examples III, IX) demonstrated better pigment grinding.

| Resin | Paste Viscosity (centipoise) |
|---|---|
| Example III | 250 |
| Example VI | 1550 |
| Example VIII | 1900 |
| Example IX | 750 |

What is claimed is:

1. A pigment grind composition comprising pigment and as a grind vehicle, an ungelled aminoester group-containing reaction product obtained by reacting carboxyl groups of a carboxylic acid group containing polymeric material with azetidinol groups of an azetidinol containing material having one azetidinol moiety per molecule.

2. The pigment grind composition of claim 1 wherein the ungelled reaction product has been modified by reaction with a polyisocyanate and polyamine.

3. The pigment grind composition of claim 1 wherein the ungelled reaction product has been modified by reaction with a triisocyanate and tetraethylene pentamine.

4. The pigment grind composition of claim 1 wherein the carboxylic acid group containing polymeric material is a carboxylic acid functional acrylic polymer.

5. The pigment grind composition of claim 4 wherein the carboxylic acid functional acrylic polymer has an acid value of at least 2.5.

6. The pigment grind composition of claim 4 wherein the acrylic polymer has a number average molecular weight ranging from about 500 to about 50,000.

7. The pigment grind composition of claim 1 wherein the azetidinol containing material is represented by the following structural formula:

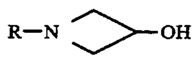

wherein R is $C_1$ to $C_{20}$ alkyl, $C_3$ to $C_7$ cycloalkyl or aralkyl.

8. The pigment grind composition of claim 7 wherein R is cyclohexyl.

9. The pigment grind composition of claim 3 wherein the pigment is a red pigment.

10. A coating composition comprising, as a film forming vehicle, an ungelled aminoester group-containing reaction product obtained by reacting carboxyl groups of a carboxylic acid group containing polymeric material with azetidinol groups of an active hydrogen containing azetidinol containing material having one azetidinol moiety per molecule; and a crosslinking agent capable of reacting with the active hydrogens.

11. The coating composition of claim 10 wherein the carboxylic acid group containing material is a carboxylic acid functional acrylic polymer.

12. The coating composition of claim 10 wherein the azetidinol containing material is N-cyclohexyl azetidinol.

13. The coating composition of claim 10 wherein the crosslinking agent is selected from aminoplasts, phenoplasts and blocked polyisocyanates.

* * * * *